United States Patent
Bao et al.

(10) Patent No.: US 12,361,563 B2
(45) Date of Patent: Jul. 15, 2025

(54) MOTION CAPTURE METHOD BASED ON UNSYNCHRONIZED VIDEOS

(71) Applicant: ZHEJIANG UNIVERSITY, Zhejiang (CN)

(72) Inventors: Hujun Bao, Hangzhou (CN); Xiaowei Zhou, Hangzhou (CN); Junting Dong, Hangzhou (CN); Qing Shuai, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 304 days.

(21) Appl. No.: 18/069,961

(22) Filed: Dec. 21, 2022

(65) Prior Publication Data

US 2023/0267621 A1 Aug. 24, 2023

Related U.S. Application Data

(63) Continuation of application No. PCT/CN2021/074324, filed on Jan. 29, 2021.

(51) Int. Cl.
*G06T 7/20* (2017.01)
*G06T 7/70* (2017.01)
*G06T 15/20* (2011.01)

(52) U.S. Cl.
CPC .......... *G06T 7/20* (2013.01); *G06T 7/70* (2017.01); *G06T 15/20* (2013.01);
(Continued)

(58) Field of Classification Search
None
See application file for complete search history.

(56) References Cited

U.S. PATENT DOCUMENTS

| 2009/0284529 A1 | 11/2009 | De Aguiar et al. |
| 2014/0072175 A1* | 3/2014 | Hasler ............... G06T 17/00 382/103 |

(Continued)

FOREIGN PATENT DOCUMENTS

| CN | 104700433 A | 6/2015 |
| CN | 109242950 A | 1/2019 |

(Continued)

OTHER PUBLICATIONS

Spatio-temporal Motion Tracking with Unsynchronized Cameras. Elhayek et al. (Year: 2012).*

(Continued)

*Primary Examiner* — Delomia L Gilliard
(74) *Attorney, Agent, or Firm* — Wiersch Law Group

(57) ABSTRACT

Disclosed is a human motion capture method based on unsynchronized videos, which can effectively recover the 3D motion of a target person through multiple unsynchronized videos of the person. In order to utilize multiple unsynchronized videos, the present disclosure provides a video synchronization and motion reconstruction method. The present disclosure is implemented in the following steps: synchronizing multiple videos based on a 3D human pose; performing motion reconstruction based on synchronized videos, modeling the motion difference across different viewpoints by using the low-rank constraint to realize high-precision human motion capture from the plurality of unsynchronized videos. According to the present disclosure, more accurate motion capture is carried out by using multiple unsynchronized videos.

5 Claims, 2 Drawing Sheets

(52) U.S. Cl.
CPC ............... *G06T 2207/10016* (2013.01); *G06T 2207/20084* (2013.01); *G06T 2207/30196* (2013.01); *G06T 2207/30244* (2013.01)

(56) References Cited

U.S. PATENT DOCUMENTS

| | | | |
|---|---|---|---|
| 2018/0357472 A1* | 12/2018 | Dreessen | ............... G06V 20/49 |
| 2020/0097732 A1 | 3/2020 | Doolittle et al. | |

FOREIGN PATENT DOCUMENTS

| | | |
|---|---|---|
| CN | 110415336 A | 11/2019 |
| CN | 111222459 A | 6/2020 |
| CN | 111243071 A | 6/2020 |
| CN | 112183184 A | 1/2021 |

OTHER PUBLICATIONS

Motion Capture from Internet Videos. Dong et al. (Year: 2020).*
International Search Report (PCT/CN2021/074324); Date of Mailing: May 8, 2021.
CN Notice Of Allowance(202010812816.X); Date of Mailing: Apr. 6, 2022.
Spatio-temporal-Motion-Tracking-with-Unsynchronized-Cameras.
Recovering-Accurate-3D-Human-Pose-in-The-Wild-Using-IMUs-and-a-Moving-Camera.
Time-correction-method-of-asynchronous-cameras-in-road-monitoring-system.

\* cited by examiner

MOTION CAPTURE METHOD BASED ON UNSYNCHRONIZED VIDEOS

CROSS-REFERENCE TO RELATED APPLICATIONS

The present application is a continuation of International Application No. PCT/CN2021/074324, filed on Jan. 29, 2021, which claims priority to Chinese Application No. 202010812816.X, filed on Aug. 13, 2020, the contents of both of which are incorporated herein by reference in their entireties.

TECHNICAL FIELD

The present disclosure belongs to the technical field of computers, in particular to a motion capture method based on unsynchronized videos.

BACKGROUND

For human motion capture from unsynchronized videos, the only way to deal with this problem currently is the single-view motion capture algorithm. However, the inherent depth ambiguity and self-occlusion problem of a single viewpoint make such algorithms unable to achieve the accuracy of multi-view reconstruction. Traditional multi-view reconstruction algorithms can only be used in a situation where all cameras record the same scene, but cannot be used in a situation where cameras record different scenes and the motions between videos are not exactly consistent.

SUMMARY

The purpose of the present disclosure is to propose a video synchronization and human reconstruction method based on multiple unsynchronized videos to improve the accuracy of motion capture.

The purpose of the present disclosure is realized by the following technical solution: a motion capture method based on unsynchronized videos, including the following steps:

(1) obtaining multiple unsynchronized videos of a target character; predicting a 3D human pose of each frame for each video by a deep neural network;

(2) calculating a similarity of each frame between each two videos and constructing a similarity matrix based on the 3D human pose obtained in step (1), solving a corresponding relationship between each frame between the two videos by dynamic programming to complete video synchronization;

(3) according to the corresponding relationship of each frame between the two videos obtained in step (2), when human motions recorded in different videos are consistent, optimizing camera poses and human motions simultaneously to minimize re-projection errors over all viewpoints and completing reconstruction of the human motions; when the motions recorded in different videos are not exactly consistent, optimizing the camera poses and the human motions in different videos simultaneously to minimize the re-projection errors from various viewing angles, combining 3D human poses of corresponding frames in all different videos into a low-rank matrix as a constraint condition in an optimization process, and using the low-rank matrix to model the motion difference for completing human motion reconstruction.

Furthermore, the step of calculating a similarity of each frame between any two videos and constructing a similarity matrix specifically includes: aligning the 3D human poses of any two frames between the two videos, then calculating an Euclidean distance of the 3D human poses between each two frames, and subsequently mapping the Euclidean distance to a value for measuring the similarity between each two frames, wherein the value of the similarity ranges from 0 to 1; taking the obtained value of the similarity of each two frames as an element in the matrix to construct a similarity matrix.

Furthermore, the step of optimizing the camera poses and the human motions specifically includes: taking the re-projection error over all viewpoints as a target function, and aligning each camera by taking the 3D human poses as a reference according to the 3D human poses in each camera; minimizing the re-projection error of the 3D human poses in each viewpoint and jointly optimizing the camera poses and human motions to obtain a 3D human pose of each frame in each video.

Furthermore, the step of modeling the low-rank matrix specifically includes: after video synchronization, constraining a matrix consisting of the 3D human poses corresponding to a same frame in different videos to be low-rank when the motions recorded by different videos are not exactly consistent, so as to indicate the motion difference of the 3D human poses corresponding to the same frame in different videos.

Furthermore, when the motions recorded in different videos are not exactly consistent, modeling the motion difference by the low-rank matrix:

$$\text{rank}(\theta_k) \leq s,$$

where $\theta_k = [\theta_{k1}^T; \theta_{k2}^T; \ldots; \theta_{kM}^T] \in R^{M \times Q}$ represents a combination of human pose parameters corresponding to a k-th frame under different viewpoints, and $\theta_{k1} \in R^{Q \times 1}$ represents a human pose parameter corresponding to the frame k in a first camera, M represents the number of videos, Q represents a dimension of the human pose parameter, and a constant s controls a degree of similarity.

The present disclosure has the following beneficial effects: the present disclosure makes more accurate motion capture by using multiple unsynchronized videos. In order to utilize multiple unsynchronized videos, the present disclosure provides a video synchronization method and a motion reconstruction method, and simultaneously models the motion difference of different videos, thus realizing high-precision motion capture.

BRIEF DESCRIPTION OF DRAWINGS

In order to more clearly explain the embodiments of the present disclosure or the technical solution in the prior art, the drawings that need to be used in the description of the embodiments or the prior art will be briefly described below. Obviously, the drawings in the following description are some embodiments of the present disclosure, and for those skilled in the art, other drawings can be obtained according to these drawings without making creative efforts.

DESCRIPTION OF EMBODIMENTS

In order to make the above objects, features and advantages of the present disclosure more obvious and easier to understand, the specific embodiments of the present disclosure will be described in detail below with reference to the drawings.

In the following description, many specific details are set forth in order to fully understand the present disclosure, but the present disclosure can be implemented in other ways different from those described here, and those skilled in the art can make similar promotion without violating the connotation of the present disclosure, therefore the present disclosure is not limited by the specific embodiments disclosed below.

Figure 1:
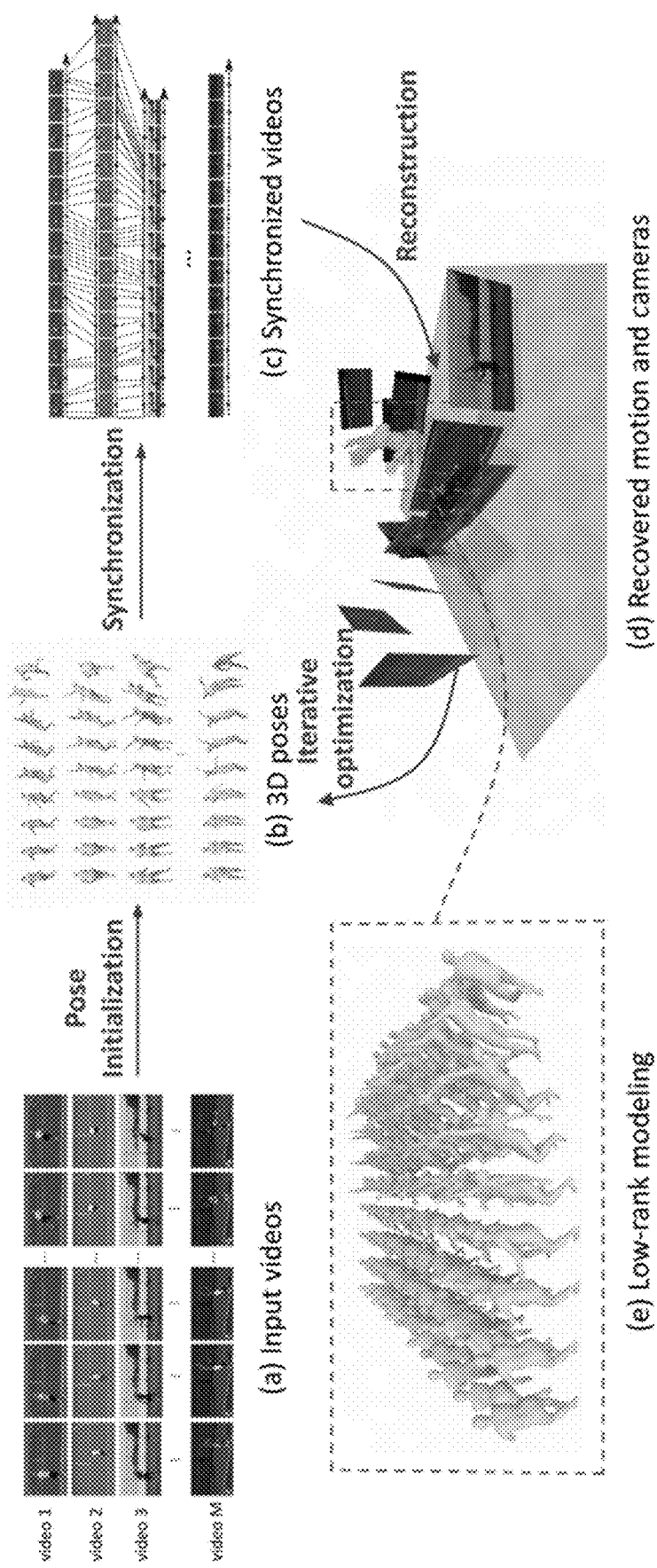
FIG. 1 is a schematic overall flow diagram of an embodiment of the present disclosure, where, (a) is a schematic diagram of multiple unsynchronized videos of a certain motion as input; (b) is a schematic diagram of initialized 3D human pose; (c) is the schematic diagram of video synchronization; (d) is a schematic diagram of the estimated human motion and camera poses; (e) is a schematic diagram of low-rank modeling of the motion difference across different videos.

As shown in FIG. 1, a motion capture method based on unsynchronized videos is proposed in the present disclosure, which includes the following steps.

(1) Multiple unsynchronized videos of a target character (such as multiple Internet videos) are obtained. As shown in (a) of FIG. 1, the plurality of videos can effectively solve the problems of depth ambiguity and self-occlusion, and the reconstructed motion is more accurate than the single-view method; for each video, the existing deep neural network method, such as VIBE, HMMR, etc., is used to process the video, and the 3D human pose of each frame is predicted, as shown in (b) of FIG. 1.

(2) Based on the 3D human poses obtained in step (1), the similarity of each frame between any each videos i and j is calculated, and a similarity matrix $A_{ij} \in R^{N_i \times N_j}$ is constructed, where $N_i$ and $N_j$ are respectively the numbers of the frames in the $i^{th}$ and $j^{th}$ videos, which specifically includes: aligning the 3D human poses of each two frames between the two videos, then calculating the Euclidean distance of the 3D human poses between each two frames, and subsequently mapping the Euclidean distance to a value for measuring the similarity between each two frames, wherein the value of the similarity ranges from 0 to 1; taking the obtained value of the similarity of each two frames as an element in the matrix to construct a similarity matrix. The corresponding relationship of each frame between two videos is solved by dynamic programming, and then the corresponding relationship between the two videos can be expressed as a matrix $X_{ij} \in \{0, 1\}^{N_i \times N_j}$ with a value of 0 or 1, where 0 means that two frames do not match and 1 means that two frames match. This result can be obtained by dynamic programming based on the similarity matrix $A_{ij}$. So far, the video synchronization has been completed, as shown in (c) of FIG. 1.

(3) Motion reconstruction is carried out according to the corresponding relationship of each frame between the two videos obtained in step (2); when the human motions recorded in different videos are consistent, the same variable is used to represent the human poses in different viewpoints, and the camera poses and human motions are simultaneously optimized to minimize the re-projection error in different viewing angles, thus completing the reconstruction of human motions.

The recovered results of the camera poses and human motions are shown in (d) of FIG. 1. In this solution, for the camera poses, the 3D human poses in different viewing angles, are aligned that is, the rotation between 3D human poses is calculated as the rotation relationship between cameras; when the motions recorded in different videos are not exactly consistent, the camera poses and the human motions in different videos are simultaneously optimized to minimize the re-projection error in different viewing angles.

Because the human motions in different videos may not be exactly consistent, assuming that the human poses of corresponding frames are very similar, a low-rank matrix can be used for modeling, that is, the 3D human poses of corresponding frames in all different videos form a low-rank matrix as a constraint condition in the optimization process.

Figures 2A, 2B, 2C, 2D:
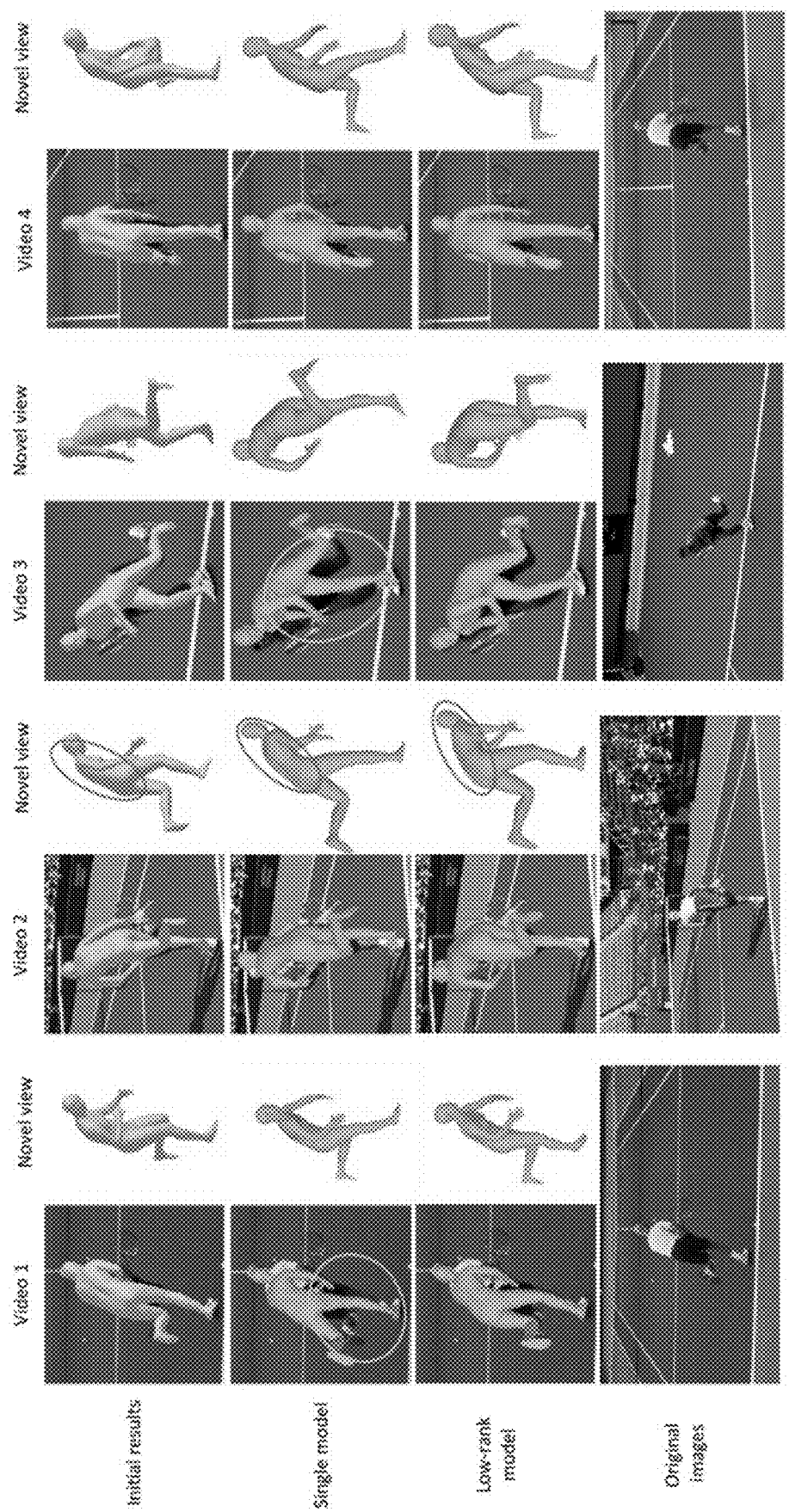
FIGS. 2(a), 2(b), 2(c) and 2(d) are schematic diagrams of modeling the motion differences by a low-rank constraint according to an embodiment of the present disclosure.

The low-rank matrix is used to model the motion difference and complete the reconstruction of human motions. Specifically, after the video synchronization, when the human motions recorded in different videos are not exactly consistent, the matrix consisting of the 3D human poses corresponding to the same frame in different videos is constrained to be low-rank, so as to express the motion difference of the 3D human poses corresponding to the same frame in different videos. The motion difference is modeled by a low-rank matrix;

$$\text{rank}(\theta_k) \leq s,$$

where $\theta_k = [\theta_{k1}^T; \theta_{k2}^T; \ldots; \theta_{kM}^T] \in R^{M \times Q}$ represents a combination of human pose parameters corresponding to a $k^{th}$ frame under different viewpoints, and $\theta_{k1} \in R^{Q \times 1}$ represents the human pose parameter corresponding to the frame k in the first camera, and so forth; M represents the number of videos, Q represents the dimension of the human pose parameter, Q=72 in the present disclosure, i.e., the human pose of the adopted human model is a vector with 72 dimensions; and a constant s controls a degree of similarity. As shown in FIGS. 2(a), 2(b), 2(c) and 2(d), four videos of the motion of the person are captured, and the initial results, the single model, the low-rank model of the videos and the corresponding novel views of the original images are compared. Specifically, FIG. 2(a) exemplaryly shows the initial results, the single model, and the low-rank model corresponding to an original image from a view of a tennis player. FIG. 2(b) exemplaryly shows the initial results, the single model, and the low-rank model corresponding to an original image of a tennis player from another view of a tennis player. FIG. 2(c) exemplaryly shows the initial results, the single model, and the low-rank model corresponding to an original image of a tennis player from another view of a tennis player. FIG. 2(d) exemplaryly shows the initial results, the single model, and the low-rank model corresponding to an original image of a tennis player from another view of a tennis player. Therefore, modeling the motion difference by a low-rank constraint according to the present disclosure can capture more precise and accurate human motions than single model of all viewpoints. The human motions captured by different videos are shown in (e) of FIG. 1.

In an embodiment, the optimization of the camera poses and human motions are as follows: the re-projection error in each viewing angle is taken as a target function; since the scenes recorded by different videos may be different, and the camera poses cannot be recovered by using the method of structure recovery motion, therefore each camera is directly aligned according to the 3D human poses in each camera by taking the 3D human poses as a reference, and the camera poses and human motions are jointly optimized by minimizing the re-projection errors of the 3D human poses in each camera to obtain the 3D human poses of each frame in each video.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

Each embodiment in this specification is described in a progressive way, and reference may be made for the same and similar parts in various embodiments. Each embodiment focuses on the differences from other embodiments. Especially, for the device embodiment, because it is basically similar to the method embodiment, the description is relatively simple. Please refer to the partial description of the method embodiment for relevant information.

The above is just a preferred embodiment of the present disclosure. Although the present disclosure has been disclosed as a preferred embodiment, it is not intended to limit the present disclosure. Those skilled in the art can make many possible changes and modifications to the technical solution of the present disclosure by using the methods and technical contents disclosed above, or modify the embodiment into equivalent embodiments with equivalent changes without departing from the scope of the technical solution of the present disclosure. Therefore, any simple modifications, equivalent changes and modifications made to the above embodiment according to the technical essence of the present disclosure without departing from the content of the technical scheme of the present disclosure are still within the scope of the protection of the technical solution of the present disclosure.

What is claimed is:

1. A motion capture method based on unsynchronized videos, comprising:
    (1) obtaining multiple unsynchronized videos of a target character; predicting a 3D human pose of each frame for each video by a deep neural network;
    (2) calculating a similarity of each frame between each two videos and constructing a similarity matrix based on the 3D human pose obtained in step (1), solving a corresponding relationship between each frame between the two videos by dynamic programming to complete video synchronization; and
    (3) optimizing, according to the corresponding relationship of each frame between the two videos obtained in step (2), camera poses and human motions simultaneously to minimize re-projection errors over all viewpoints and completing reconstruction of the human motions, when human motions recorded in different videos are consistent;
    optimizing the camera poses and the human motions in different videos simultaneously to minimize the re-projection errors from various viewing angles, when the motions recorded in different videos are not exactly consistent,
    combining 3D human poses of corresponding frames in all different videos into a low-rank matrix as a constraint condition in an optimization process, and
    modeling a motion difference to complete reconstruction of the human motions by the low-rank matrix.

2. The motion capture method based on unsynchronized videos according to claim 1, wherein in step (2), the step of calculating a similarity of each frame between each two videos and constructing a similarity matrix comprises: aligning the 3D human poses of each two frames between the two videos, then calculating an Euclidean distance of the 3D human poses between each two frames, subsequently mapping the Euclidean distance to a value for measuring the similarity between each two frames, wherein the value of the similarity ranges from 0 to 1, and taking the obtained value of the similarity of each two frames as an element in the matrix to construct a similarity matrix.

3. The motion capture method based on unsynchronized videos according to claim 1, wherein in step (3), the step of optimizing the camera poses and the human motions specifically comprises: taking the re-projection error over all viewpoints as a target function, and aligning each camera by taking the 3D human poses as a reference according to the 3D human poses in each camera; and minimizing the re-projection error of the 3D human poses in each viewpoint and jointly optimizing the camera poses and human motions to obtain a 3D human pose of each frame in each video.

4. The motion capture method based on unsynchronized videos according to claim 1, wherein in step (3), the step of modeling the low-rank matrix specifically comprises: after video synchronization, constraining a matrix consisting of the 3D human poses corresponding to a same frame in different videos to be low-rank when the human motions recorded by different videos are not exactly consistent, so as to indicate the motion difference of the 3D human poses corresponding to the same frame in different videos.

5. The motion capture method based on unsynchronized videos according to claim 1, wherein in step (3), when the motions recorded in different videos are not exactly consistent, modeling the motion difference by the low-rank matrix:

$$\text{rank}(\theta_k) \leq s,$$

where $\theta_k = [\theta_{k1}^T; \theta_{k2}^T; \ldots; \theta_{kM}^T] \in R^{M \times Q}$ represents a combination of human pose parameters corresponding to a $k^{th}$ frame under different viewpoints, and $\theta_{k1} \in R^{Q \times 1}$ represents a human pose parameter corresponding to the frame k in a first camera, M represents the number of videos, Q represents a dimension of the human pose parameter, and a constant s controls a degree of similarity.

* * * * *